United States Patent
Qi et al.

(10) Patent No.: US 11,880,094 B2
(45) Date of Patent: Jan. 23, 2024

(54) EYEGLASS LENS

(71) Applicants: HOYA LENS THAILAND LTD., Pathumthani (TH); Hua Qi, Tokyo (JP); Takako Ishizaki, Tokyo (JP); Shigetoshi Kono, Tokyo (JP)

(72) Inventors: Hua Qi, Tokyo (JP); Takako Ishizaki, Tokyo (JP); Shigetoshi Kono, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 557 days.

(21) Appl. No.: 17/255,411

(22) PCT Filed: Jun. 27, 2019

(86) PCT No.: PCT/JP2019/025616
§ 371 (c)(1),
(2) Date: Dec. 22, 2020

(87) PCT Pub. No.: WO2020/004551
PCT Pub. Date: Jan. 2, 2020

(65) Prior Publication Data
US 2021/0278699 A1    Sep. 9, 2021

(30) Foreign Application Priority Data

Jun. 29, 2018 (JP) .................................. 2018-125123

(51) Int. Cl.
*G02C 7/02* (2006.01)
*G02B 1/14* (2015.01)

(52) U.S. Cl.
CPC .................. *G02C 7/02* (2013.01); *G02B 1/14* (2015.01)

(58) Field of Classification Search
CPC .................................... G02C 7/02; G02B 1/14
(Continued)

(56) References Cited

U.S. PATENT DOCUMENTS

| | | | |
|---|---|---|---|
| 2011/0080645 | A1 | 4/2011 | Tsuno et al. |
| 2012/0199384 | A1 | 8/2012 | Kajiya et al. |

(Continued)

FOREIGN PATENT DOCUMENTS

| | | |
|---|---|---|
| CN | 104678572 A | 6/2015 |
| EP | 2711741 A1 | 3/2014 |

(Continued)

OTHER PUBLICATIONS

EP19826596.9, "Extended European Search Report", dated Feb. 28, 2022, 9 pages.

(Continued)

*Primary Examiner* — James R Greece
(74) *Attorney, Agent, or Firm* — Kilpatrick Townsend & Stockton LLP

(57) ABSTRACT

Provided is an eyeglass lens 1 configured to cause rays that have entered from an object-side surface 3 to be emitted from an eyeball-side surface 4, and cause the emitted rays to converge at a predetermined position A. The eyeglass lens 1 includes a lens base material 2 having a plurality of base material convex portions 6 on at least one of the object-side surface 3 and the eyeball-side surface 4, and a coating film covering the surface provided with the base material convex portions 6. The shape of convex portions present on the outermost surface of the eyeglass lens located on a side on which the base material convex portions 6 are provided is an approximate shape of the base material convex portions configured to cause rays that have entered the eyeglass lens 1 to converge at a position B that is closer to the object than the predetermined position A is.

6 Claims, 9 Drawing Sheets

(58) Field of Classification Search
USPC .................................................. 351/159.01
See application file for complete search history.

(56) References Cited

U.S. PATENT DOCUMENTS

2017/0131438 A1* 5/2017 Watanabe .............. G02C 7/104
2017/0131567 A1   5/2017 To et al.

FOREIGN PATENT DOCUMENTS

| JP | 2012-163789 A | 8/2012 | |
| WO | 2008084604 A1 | 7/2008 | |
| WO | 2012157072 A1 | 11/2012 | |
| WO | 2015163467 A1 | 10/2015 | |
| WO | 2018026697 A1 | 2/2018 | |
| WO | WO-2018026697 A1 * | 2/2018 | ........... A61B 3/1005 |
| WO | 2018076057 A1 | 5/2018 | |

OTHER PUBLICATIONS

PCT/JP2019/025616, English translation of "International Search Report," dated Sep. 3, 2019, 3 pages.
PCT/JP2019/025616, "International Preliminary Report on Patentability", dated Jan. 7, 2021, 10 pages.
KR10-2020-7035198, "Request for the Submission of an Opinion" with Machine Translation, dated Jun. 20, 2022, 11 pages.

* cited by examiner

Portion having maximum absolute value of differences in lens thickness direction between shape of virtual partial sphere and shape of actual coating film convex portion Protrusion start portion Protrusion end portion Portion having maximum absolute value of differences in lens thickness direction between shape of actual coating film convex portion and base material convex portion Protrusion start portion in lens base material Protrusion end portion in lens base material

EYEGLASS LENS

CROSS-REFERENCE TO RELATED APPLICATIONS

This application is a National Stage of International Application No. PCT/JP2019/025616, filed Jun. 27, 2019, which claims priority to Japanese Patent Application No. 2018-125123, filed Jun. 29, 2018, and the contents of which is incorporated by reference.

TECHNICAL FIELD

The present disclosure relates to an eyeglass lens.

BACKGROUND ART

Patent Document 1 (US Publication No. 2017/131567) discloses an eyeglass lens for suppressing the progression of a refractive error such as near-sightedness. Specifically, for example, a spherical minute convex portion (a base material convex portion in this specification) with a diameter of about 1 mm is formed on a convex surface, which is the object-side surface of the eyeglass lens. With an eyeglass lens, normally, rays that have entered from the object-side surface are emitted from the eyeball-side surface and thus are focused on the wearer's retina (a predetermined position A in this specification). On the other hand, as for light that has passed through the minute convex portion, rays that are incident on the eyeglass lens are focused at a position B closer to the object than the predetermined position A is. As a result, the progression of near-sightedness is suppressed.

CITATION LIST

Patent Documents

Patent Document 1: US Publication No. 2017/131567

SUMMARY OF DISCLOSURE

Technical Problem

The inventor of the present disclosure found that, if a coating film (e.g., a hard coating film or an antireflection film), which is the same as a conventional coating film, is formed on a surface (a convex surface, which is the object-side surface), which is provided with the minute convex portion, of the eyeglass lens disclosed in Patent Document 1, the function of suppressing the progression of near-sightedness may deteriorate.

One embodiment of the present disclosure aims to provide a technique by which the effect of suppressing near-sightedness can be sufficiently exhibited even after a coating film is formed on a lens base material.

Solution to Problem

The inventor of the present disclosure conducted intensive studies to resolve the above-described issues. The coating film covers a surface having the base material convex portion. In this case, the outermost surface shape of the coating film has a coating film convex portion originating from the base material convex portion.

If no coating film is provided, rays are focused due to the base material convex portion at a position closer to the object than the predetermined position A is. However, if a coating film is formed on the lens base material, whether rays are focused on the same position as that of the base material convex portion or the vicinity thereof depends on the outermost surface shape of the coating film, that is, the shape of the coating film convex portion.

In view of this, the inventor of the present disclosure conceived the following methods.

The inventor found that, if the shape of a convex portion on the outermost surface of an eyeglass lens is an approximate shape of a base material convex portion, the effect of suppressing near-sightedness can be sufficiently exhibited.

Preferably, the shape of a base material convex portion (i.e., a partially spherical shape) is virtualized from the shape of an actual coating film convex portion. The inventor found that the effect of suppressing nearsightedness can be further exhibited when a difference between the shape of a virtual partial sphere and the shape of the actual coating film convex portion is kept at a predetermined value.

The present disclosure was made based on the above-described findings.

A first aspect of the present disclosure is an eyeglass lens configured to cause rays that have entered from an object-side surface to be emitted from an eyeball-side surface, and cause the emitted rays to converge at a predetermined position A, the eyeglass lens including:

a lens base material having a plurality of base material convex portions on at least one of the object-side surface and the eyeball-side surface; and a coating film covering the surface provided with the base material convex portions, in which a shape of convex portions present on the outermost surface of the eyeglass lens located on a side on which the base material convex portions are provided is an approximate shape of the base material convex portions configured to cause rays that have entered the eyeglass lens to converge at a position B that is closer to the object than the predetermined position A is.

A second aspect of the present disclosure is an aspect according to the first aspect, in which a shape of the outermost surface of the coating film includes a coating film convex portion originating from the base material convex portions, the coating film convex portion is configured to cause rays that have entered the eyeglass lens to converge at the position B that is closer to the object than the predetermined position A is, and the maximum absolute value of differences in a lens thickness direction between a spherical surface that is optimally approximated to a shape of the coating film convex portion and the shape of the actual coating film convex portion is 0.1 µm or less.

A third aspect of the present disclosure is an aspect according to the second aspect, in which the coating film convex portion is configured to cause rays that have entered the eyeglass lens to converge at the position B that is closer to the object than the predetermined position A is by an amount in a range of more than 0 mm and 10 mm or less.

A fourth aspect of the present disclosure is an aspect according to the second or third aspect, in which, out of a large number of rays that can be obtained by ray tracing calculation, evenly enter a predetermined range of the object-side surface of the eyeglass lens, and pass through the coating film, the number of stray light rays that do not pass through the vicinity of the predetermined position A or the vicinity of the position B that is closer to the object is less than or equal to 30% of the number of incident rays.

A fifth aspect of the present disclosure is an aspect according to any of the second to fourth aspects, in which a profile curve of astigmatism at a base of the coating film convex portion in an astigmatism distribution for the shape of the outermost surface of the coating film is 0.20 mm or less.

A sixth aspect of the present disclosure is an aspect according to any of the first to fifth aspects, in which the coating film includes a λ/4 film that is in contact with the lens base material, a hard coating film formed on the λ/4 film, and an antireflection film formed on the hard coating film.

A seventh aspect of the present disclosure is an aspect according to the sixth aspect, in which a refractive index of the lens base material is higher than that of the λ/4 film, and a refractive index of the λ/4 film is higher than that of the hard coating film.

Advantageous Effects of Disclosure

According to one embodiment of the present disclosure, the effect of suppressing near-sightedness can be sufficiently exhibited even after a coating film is formed on a lens base material.

DESCRIPTION OF EMBODIMENTS

The following describes embodiments of the present disclosure. The description below is exemplary, and the present disclosure is not limited to the aspects that are described as examples.

Figure 1:
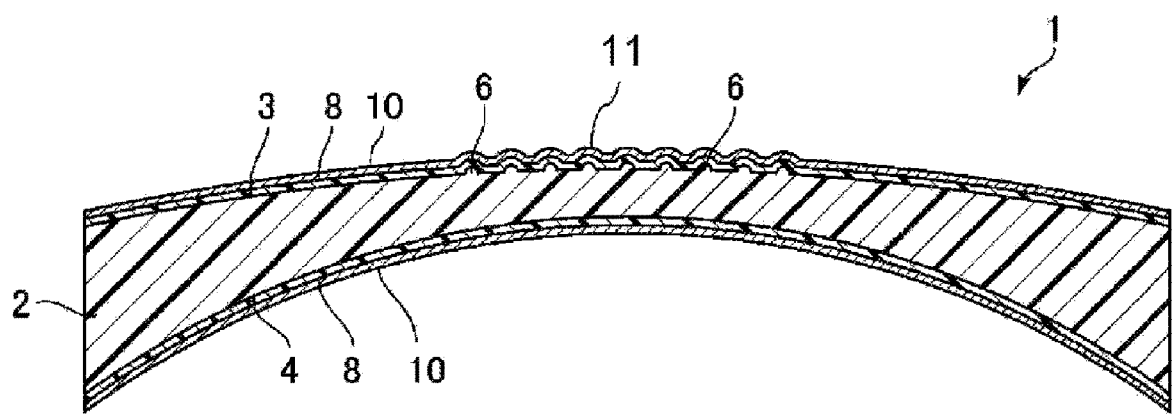
FIG. 1 is a cross-sectional view showing one example of an eyeglass lens according to one aspect of the present disclosure.

FIG. 1 is a cross-sectional view showing one example of an eyeglass lens 1 according to one aspect of the present disclosure.

An example is shown in FIG. 1 in which an object-side surface 3 is a convex surface, and an eyeball-side surface 4 is a concave surface (an example of so-called meniscus lens).

The eyeglass lens 1 according to one aspect of the present disclosure has the object-side surface 3 and the eyeball-side surface 4. The "object-side surface 3" is the surface that is located on the object side when a wearer wears the glasses including the eyeglass lens 1. The "eyeball-side surface 4" is the surface that is located on the opposite side, that is, the eyeball side, when the wearer wears the glasses including the eyeglass lens 1.

With the eyeglass lens 1 according to one aspect of the present disclosure, similarly to a conventional eyeglass lens 1, the base portion other than the minute convex portions (i.e., the base material convex portions 6 and the coating film convex portions 11 thereon) disclosed in Patent Document 1 functions to cause rays that have entered from the object-side surface 3 to be emitted from the eyeball-side surface 4 and to cause the emitted rays to converge at the predetermined position A.

Figure 2:
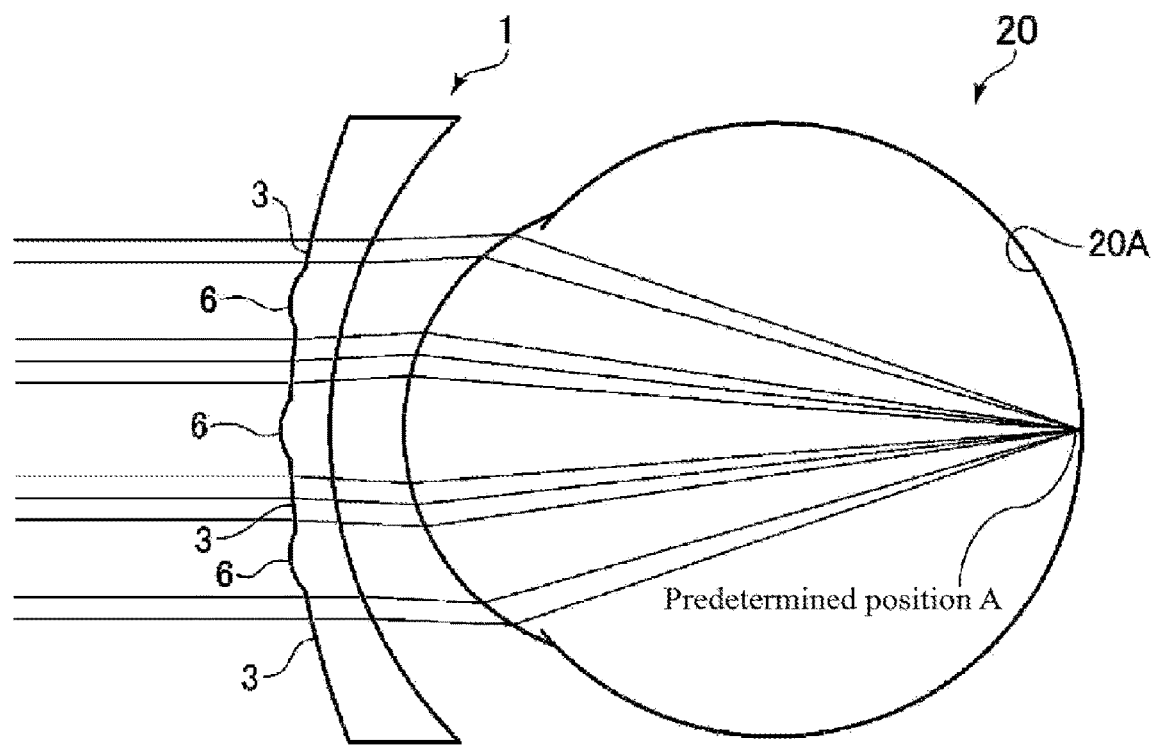
FIG. 2 is a schematic side sectional view showing how an eyeglass lens according to one aspect of the present disclosure causes rays that have entered from the object-side surface to be emitted from the eyeball-side surface due to a portion other than the coating film convex portions (that is, the base portion), and causes the emitted rays to converge at a predetermined position A on the retina of the eyeball.

FIG. 2 is a schematic side sectional view showing how the eyeglass lens 1 according to one aspect of the present disclosure causes rays that have entered from the object-side surface 3 to be emitted from the eyeball-side surface 4 and causes the emitted rays to converge at the predetermined position A located on a retina 20A of an eyeball 20, due to a portion (i.e., the base portion) other than the coating film convex portions 11.

The eyeglass lens 1 according to one aspect of the present disclosure includes a lens base material 2. The lens base material 2 also has an object-side surface 3 and an eyeball-side surface 4. The shape of both surfaces of the lens base material 2 may be determined according to the type of eyeglass lens 1, and may be a convex surface, a concave surface, a flat surface, or a combination thereof.

The eyeglass lens 1 is formed by forming a coating film to cover at least one of the object-side surface and the eyeball-side surface of the lens base material 2.

A plurality of base material convex portions 6 are formed on at least one of the object-side surface 3 and the eyeball-side surface 4 of the lens base material 2 according to one aspect of the present disclosure. In a state in which the coating film is formed on the base material convex portions 6 and the coating film convex portions 11 originating from the base material convex portions 6 are formed on the outermost surface of the coating film, the coating film convex portions 11 cause rays that have entered the eyeglass lens 1 to converge at a position B that is closer to the object than the predetermined position A is.

Figure 3:
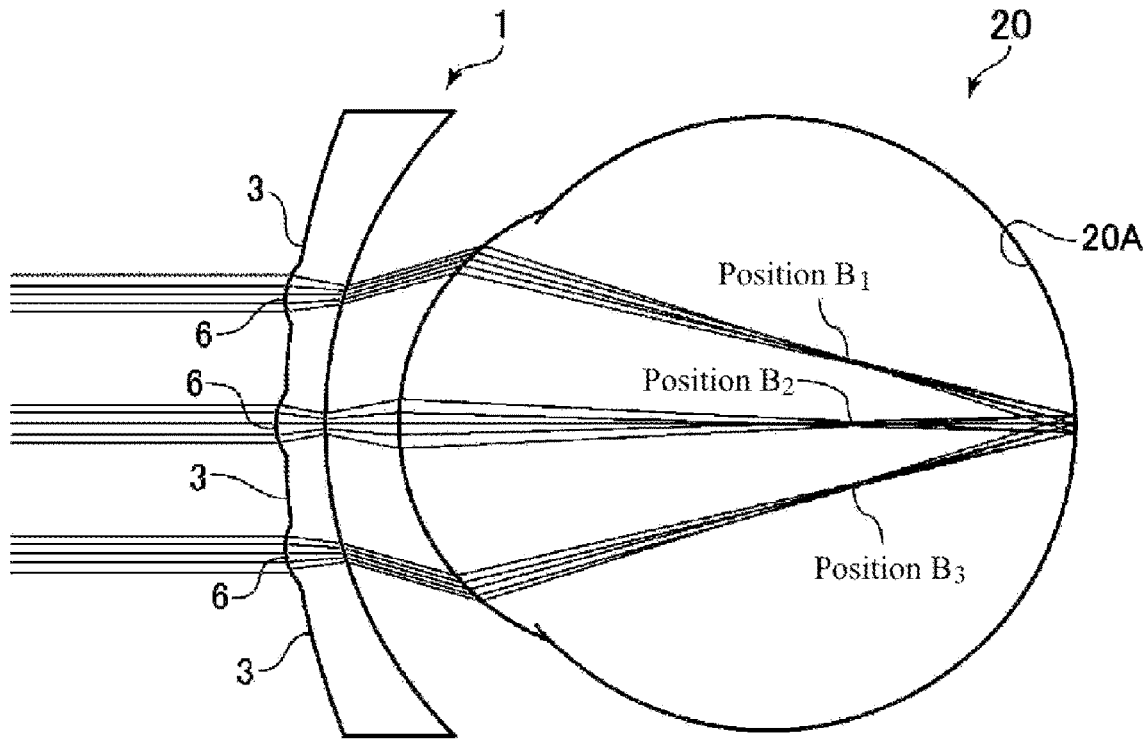
FIG. 3 is a schematic side sectional view showing how an eyeglass lens according to one aspect of the present disclosure causes rays that have entered from the object-side surface to be emitted from the eyeball-side surface due to a coating film convex portion, and causes the emitted rays to converge at a position B that is closer to the object than the predetermined position A is.

FIG. 3 is a schematic side sectional view showing how the eyeglass lens 1 according to one aspect of the present disclosure causes rays that have entered from the object-side surface 3 to be emitted from the eyeball-side surface 4 due to the coating film convex portions 11, and causes the emitted rays to converge at the position B that is closer to the object than the predetermined position A is. Note that this convergence position B is present as positions $B_1$, $B_2$, $B_3$, ... $B_N$ according to the plurality of coating film convex portions 11. The convergence position B in this specification is an expression of the collection of the positions $B_1$, $B_2$, $B_3$, ... $B_N$.

In one aspect of the present disclosure, the shape of a convex portion (e.g., the coating film convex portion 11) on the outermost surface of the eyeglass lens located on the side on which the base convex portions 6 are provided is an approximate shape of the base convex portion configured to cause rays that have entered the eyeglass lens to converge at the position B that is closer to the object than the predetermined position A is.

The approximate shape of the base material convex portion refers to a shape in a state in which a spherical surface (referred to as the shape of a virtual partial sphere hereinafter) that is optimally approximated to the shape of the coating film convex portion 11 and the shape of the base material convex portion 6 are approximated to each other.

One specific example of the approximate shape of the base material convex portion is as follows. It is preferable that the maximum absolute value of the differences in the lens thickness direction between the spherical surface that is optimally approximated to the shape of the coating film convex portion 11 and the shape of the actual coating film convex portion 11 is 0.1 μm or less (preferably, 0.06 μm or less).

The following describes advantages in defining the shape of a virtual partial sphere and the difference.

If no coating film is provided, the base material convex portions 6 have a substantially partially spherical shape, and rays are focused at the position B that is closer to the object. Even if a coating film is formed on the lens base material 2 and the coating film convex portion 11 has a more obtuse shape than the base material convex portion 6 does, at least a vertex portion of the coating film convex portion 11 has a shape following the base material convex portion 6.

In one aspect of the present disclosure, based on a substantially partially spherical shape of the vertex portion of the coating film convex portion 11, a spherical surface that is optimally approximated to this substantially partially spherical shape is virtualized. Accordingly, a virtual partially spherical shape is obtained. Then, the virtual partially spherical shape is compared to the shape of the actual coating film convex portion 11.

Figure 4:
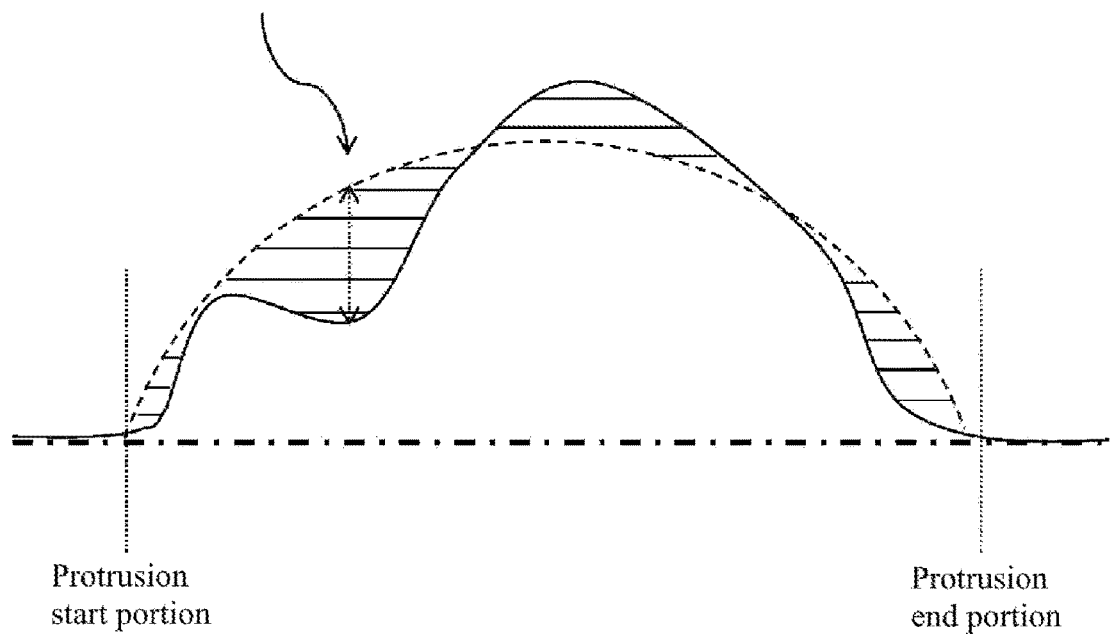
FIG. 4 is a schematic cross-sectional view showing a coating film convex portion of an actual eyeglass lens and the shape of a virtual partial sphere.

FIG. 4 is a schematic cross-sectional view showing the coating film convex portion 11 of the actual eyeglass lens 1 and the virtual partially spherical shape. The solid line indicates the coating film convex portion 11 of the actual eyeglass lens 1, and the broken line indicates the virtual partially spherical shape, the dash-dot line indicates a base portion of the actual eyeglass lens 1, and a horizontal portion indicates the difference between the virtual partially spherical shape and the shape of the actual coating film convex portion 11 in the lens thickness direction.

The virtual partially spherical shape refers to a partial shape of a sphere that is optimally approximated to the shape of the coating film convex portion 11 of the actual eyeglass lens 1. This virtual partially spherical shape can be obtained using the method of least squares, for example.

One specific example of optimal approximation is as follows. A spherical shape is disposed to overlap the shape of the coating film convex portion 11. The difference in the lens thickness direction (an optical axis method, the Z-axis) between the two shapes of portions whose protrusions start from the base portion on the outermost surface of the eyeglass lens 1 and end at the base portion through the vertex is squared. A virtual partially spherical shape that minimizes the sum of these values is set.

As a method other than the method of least squares, the virtual partially spherical shape may be obtained from a plurality of positions of the vertex of the coating film convex portion 11 and the vicinity thereof. In this case, the difference may be examined by matching the vertex of the virtual partially spherical shape with the vertex of the coating film convex portion 11 of the actual eyeglass lens 1.

If the maximum absolute value of the differences is 0.1 μm or less (preferably, 0.06 μm or less), the coating film convex portion 11 is very close to the partially spherical shape. As a result, the effect of suppressing near-sightedness can be sufficiently exhibited. Furthermore, when this specification is applied, the effect of suppressing near-sightedness can be significantly exhibited, and the need to expose a cross-section of the actually produced eyeglass lens 1 and check whether or not the shape of the coating film convex portion can faithfully reflect the shape of the base material convex portion is eliminated.

A point where a curve, which is obtained by curving the shape of the coating film convex portion 11 and differentiating the obtained curve once, has increased may be used as the protrusion start portion protruding from the base portion on the outermost surface. Also, a peak rising portion that rises from the astigmatism profile curve shown in FIG. 11(b), which will be described later, may be used as the protrusion start portion. The protrusion end portion may be set in the same manner.

The following describes further specific examples of one aspect of the present disclosure, preferred examples, and variations.

In one aspect of the present disclosure, out of a large number of rays that can be obtained by ray tracing calculation, evenly enter a predetermined range of an object-side surface of an eyeglass lens, and pass through the coating film, the number of stray light rays that do not pass through the vicinity of the predetermined position A or the vicinity of the position B that is closer to the object is preferably set to 30% or less of the number of incident rays.

The following describes advantages in reducing stray light rays and the ratio of stray light rays.

Stray light rays are rays that enter from the object-side surface 3 of the eyeglass lens 1 and are emitted from the eyeball-side surface 4, and indicate rays that do not pass through the vicinity of the predetermined position A at which rays converge due to the eyeglass lens 1, and do not pass through the vicinity of the position B at which rays converge due to the base material convex portions 6 and the coating film convex portions 11. Stray light rays cause blur in the wearer's visual field. Thus, it is preferable to reduce the ratio of stray light rays relative to rays that enter from the object-side surface 3 of the eyeglass lens 1 and are emitted from the eyeball-side surface 4.

One of the reasons for stray light rays is a coating film. If the shape extending from the convex surface, which is the object-side surface 3 serving as the base, changes excessively slowly at the base portion of the coating film convex portion 11, the resulting shape is different from the spherical shape of the base material convex portion 6, and also is different from the convex surface, which is the object-side surface 3. Accordingly, rays will not be focused on the retina 20A of the wearer (the vicinity of the predetermined position A in this specification), and will not be focused in the vicinity of the position B that is closer to the object.

On the other hand, as with the eyeglass lens 1 of one aspect of the present disclosure, even after a coating film is formed on the lens base material 2, the effect of suppressing near-sightedness can be sufficiently exhibited by setting the ratio of stray light rays to 30% or less.

Ray tracing calculation is used to set the ratio of stray light rays. A situation in which a large number of rays evenly enter a predetermined range of the object-side surface of the eyeglass lens and pass through the coating film (i.e., a situation in which the eyeglass lens is worn and the wearer looks at the outside) is presumed in this calculation. This "predetermined range" needs only be an optical region on the object-side surface. This "optical region" indicates a portion having a curved surface shape that realizes the power set for each wearer on the object-side surface and the eyeball-side surface that is located opposite thereto.

Considering that one of the reasons for the occurrence of stray light rays is a coating film and the eyeglass lens 1 according to one aspect of the present disclosure needs the coating film, the ratio of stray light rays may be set to more than 0% (or 1% or more, and 3% or more) and 30% or less. Also, because it is preferable to reduce the ratio of stray light rays, the ratio of stray light rays is preferably set to 20% or less, and more preferably set to 15% or less.

Here, conditions under which the ratio of stray light rays is determined will be described below.

Figure 5:
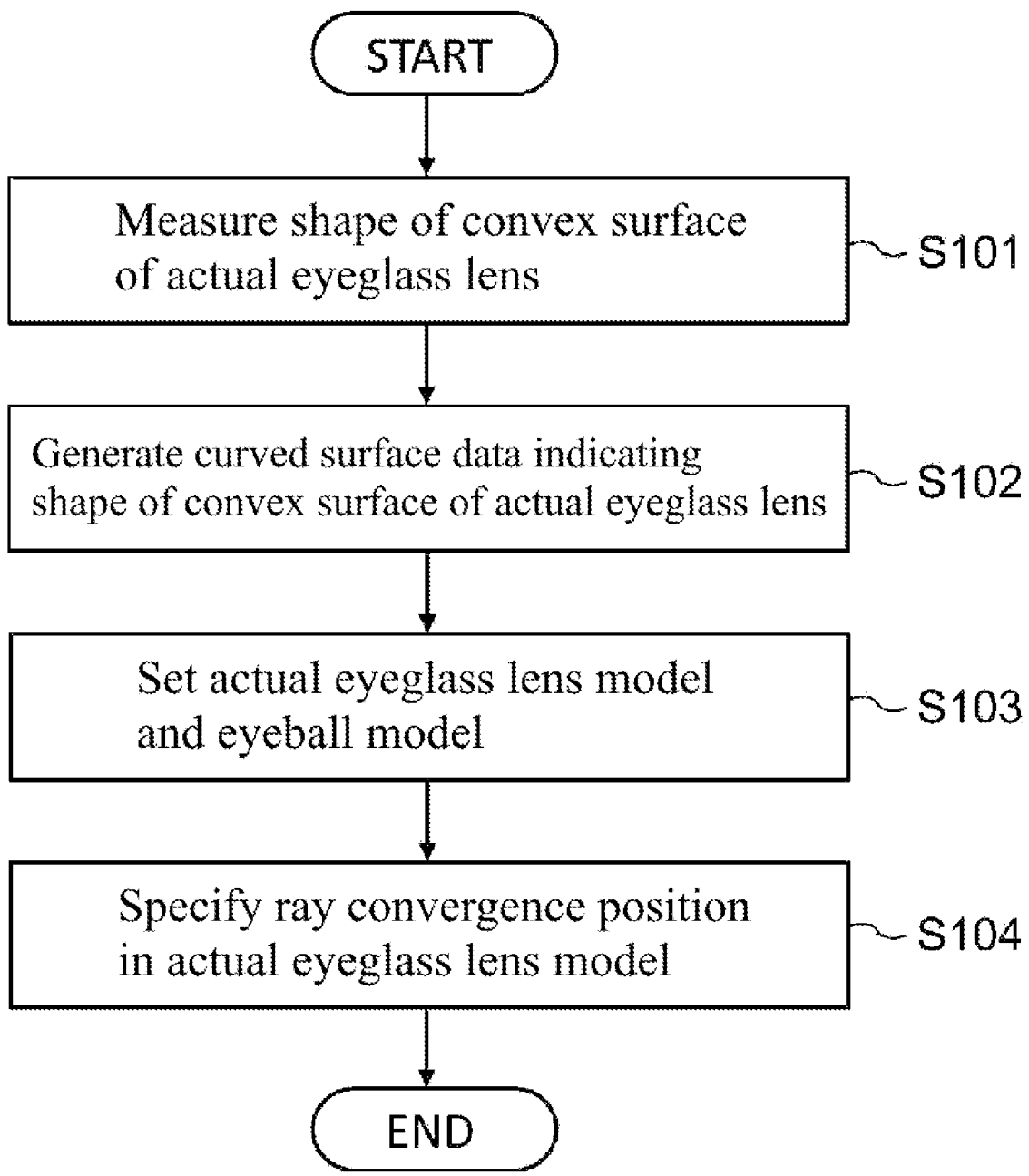
FIG. 5 is a flowchart showing the flow of a method for inspecting an eyeglass lens according to one aspect of the present disclosure.

FIG. 5 is a flowchart showing the flow of a method for inspecting an eyeglass lens according to one aspect of the present disclosure.

As shown in FIG. 5, first, in step S101, the shape of the object-side surface (also referred to as "convex surface") of the actual eyeglass lens 1 is measured, and curved surface data representing the shape of the convex surface 3 is generated (shape measurement step). The shape of the convex surface 3 is measured by a noncontact three-dimensional microscope for measuring the length, utilizing interference of light, for example. The three-dimensional shape of the convex surface 3 is acquired as discrete three-dimensional data (x, y, z), for example.

Then, in step S102, curved surface data is generated from the obtained data indicating the shape of the convex surface of the eyeglass lens 1 (curved surface data generation step). Note that, if discrete three-dimensional data is used as data indicating the shape of the convex surface of the eyeglass lens 1, a set of B-spline curves need only be generated. Also, if measured discrete three-dimensional data includes noise, moving average processing may be performed and an average value may be used, for example.

Then, in step S103, a model of the actual eyeglass lens 1 is set based on the curved surface data (model setting step).

The model of the actual eyeglass lens 1 is set, and an eyeball model is also set. Information relating to the wearer (e.g., the axial length and accommodation amount of the eye) may be used for an eyeball model. At this time, an eyeglass lens model 30 may be disposed with respect to an eyeball model 32 in consideration of the inclination of the eyeglass lens when attached to the frame thereof (a forward tilt angle and a frame tilt angle).

Then, in step S104, the position at which rays converge most when the rays have passed through the actual eyeglass lens 1 is specified through a ray tracing process (convergence position specifying step). Specifically, the PSF (Point Spread Function) representing the luminance distribution obtained after rays emitted from a point source at infinity have passed through the model set based on the curved surface data of the actual eyeglass lens 1 is obtained.

The PSF can be obtained by tracing a large number of rays emitted from the point light source and calculating the density of spots on any plane. Then, the position (plane) on which rays are most concentrated in any plane is specified by comparing the PSFs in the relevant plane. Note that the diameter of rays need only be set based on the pupil diameter, and may be set to 4φ, for example.

Figure 6:
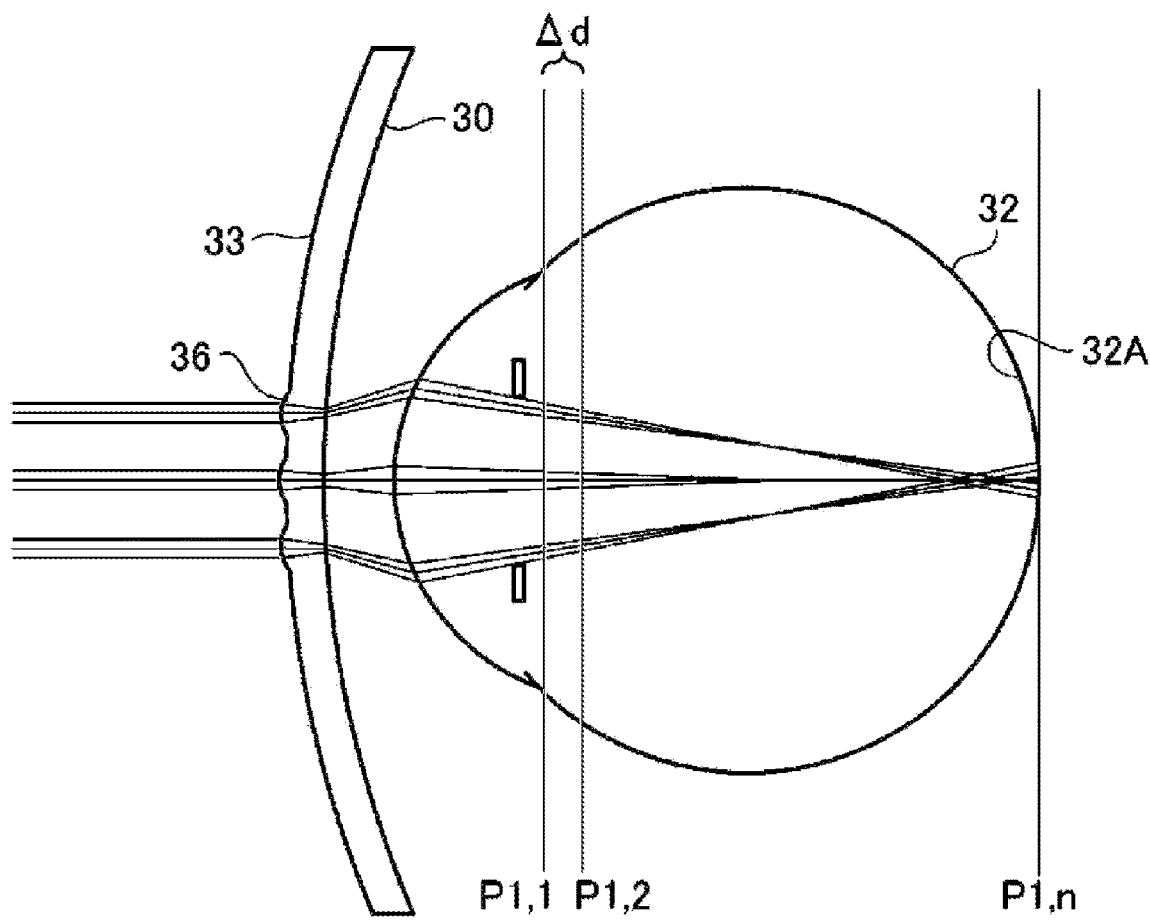
FIG. 6 is a diagram (No. 1) illustrating a method for specifying a position on which rays are concentrated.
Figure 7:
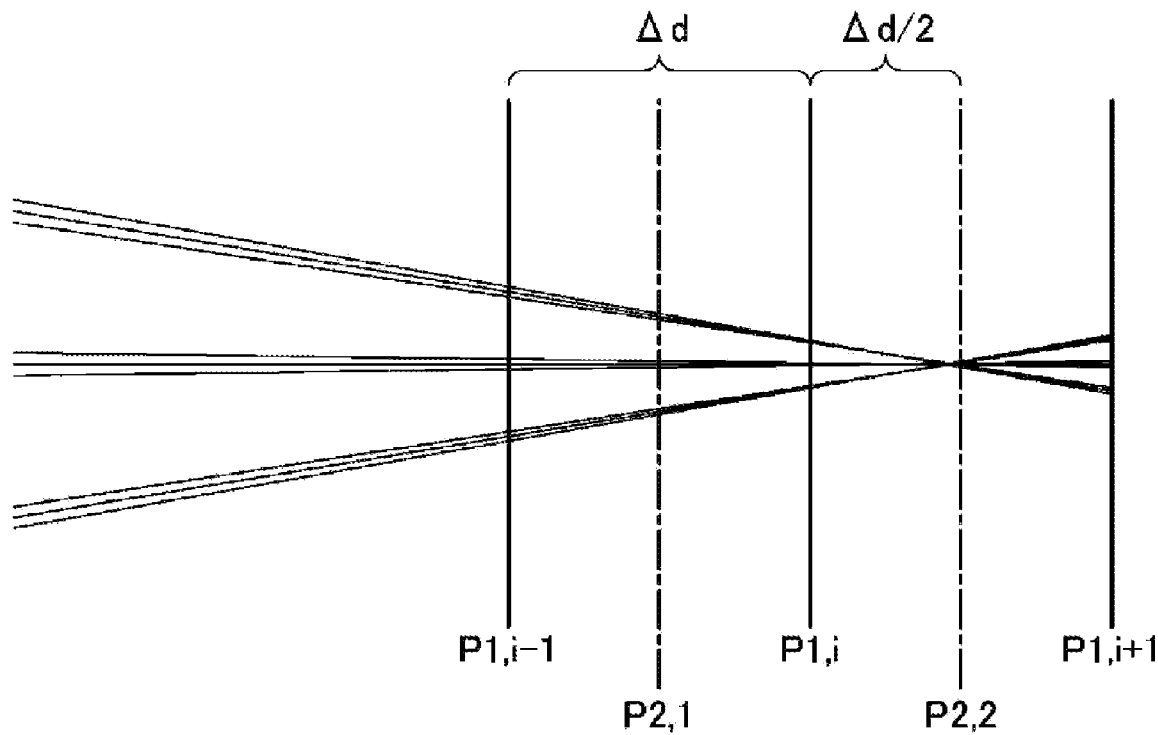
FIG. 7 is a diagram (No. 2) illustrating a method for specifying a position on which rays are concentrated.
Figure 8:
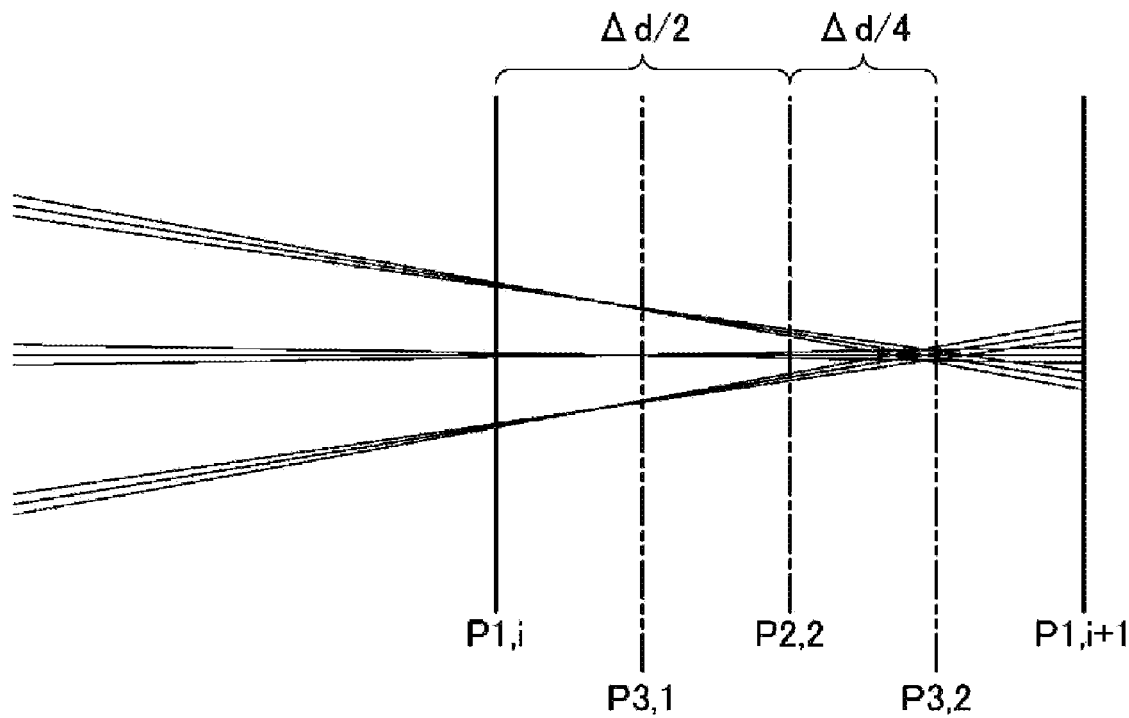
FIG. 8 is a diagram (No. 3) illustrating a method for specifying a position on which rays are concentrated.
Figure 9:
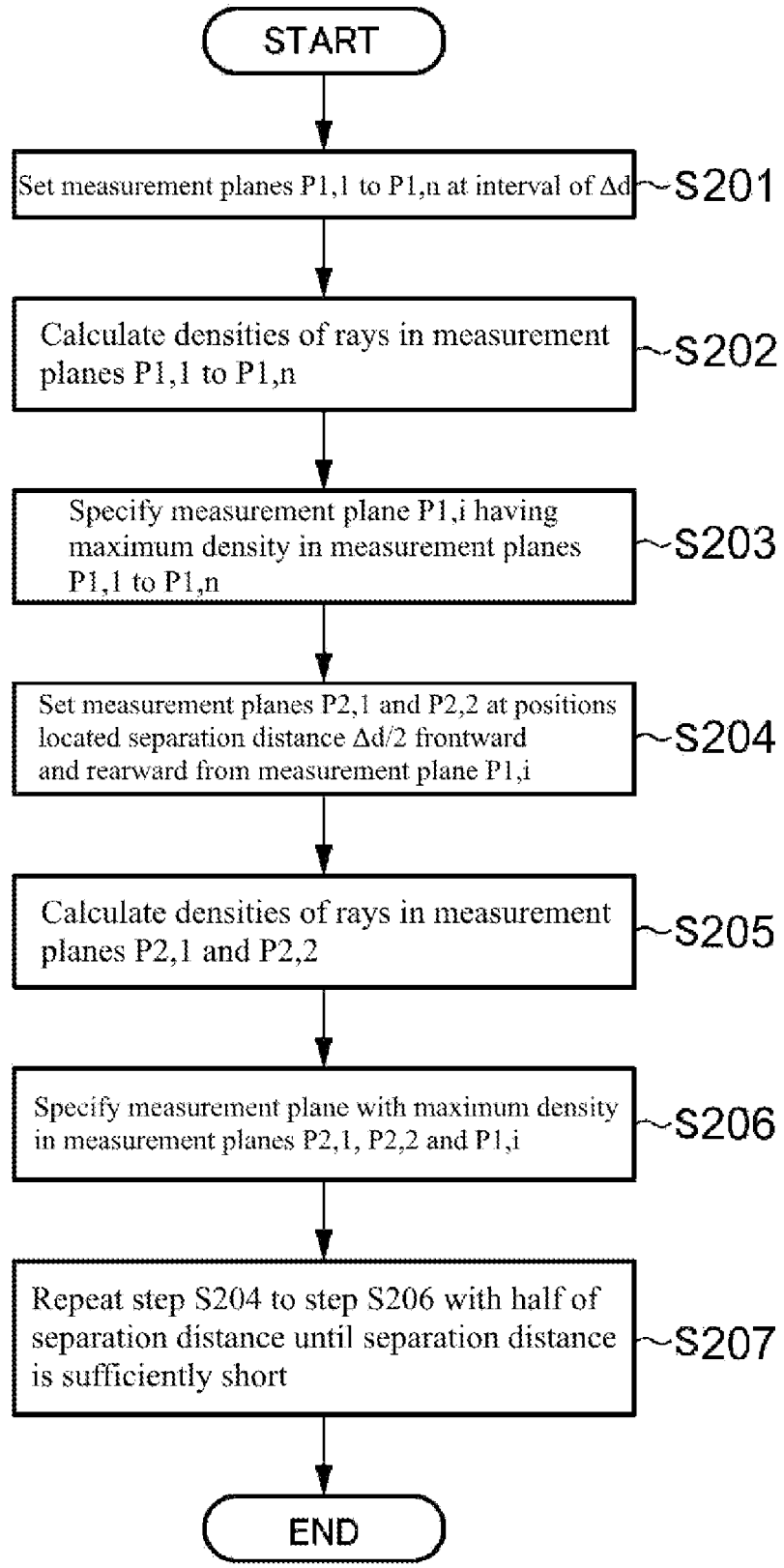
FIG. 9 is a flowchart illustrating a method for specifying a position on which rays are concentrated.

Here, a method for specifying, in step S104, the position on which rays are most concentrated will be described in more detail. FIGS. 6 to 8 are diagrams illustrating the method for specifying a position on which rays are concentrated. Also, FIG. 9 is a flowchart showing the method for specifying a position on which rays are concentrated.

First, as shown in FIG. 6, in step S201, a situation is presumed in which rays pass through the coating film convex portion 36 of the object-side surface (the convex surface) 33 on a model. Then, measurement planes P1,1 to P1,$n$ are set at increments of a predetermined separation interval Δd (e.g., 0.1 mm) from a predetermined distance (e.g., a position located at about 16 mm, which is the thickness of the vitreous body) from a position of 0 mm on the retina 32A of the eyeball model 32 to the retina 32A. Note that the separation interval Δd may be set to an interval of 0.2 mm or 1/50 of the axial length of the eye.

Then, a ray tracing process is performed, and the densities of rays in the measurement planes P1,1 to P1,$n$ are calculated in step S202. The densities of rays need only be calculated by setting a lattice-shaped grid (e.g., 0.1 mm×0.1 mm) to each measurement plane and calculating the number of rays passing through the grids, for example.

Then, in step S203, in order to specify a measurement plane where rays that have entered the convex portion have the maximum density, in the measurement planes P1,1 to P1,$n$, the measurement plane P1,$i$ where rays have the first local maximum density from the predetermined distance is specified. In order to omit calculation, calculation of the ray density may be started from the measurement plane P1, and calculation of this step may be terminated when after the first local maximum density is detected, the value obtained by calculating the ray density decreases to about an intermediate value between the value in the measurement plane P1 and the first local maximum value.

Then, as shown in FIG. 7, in step S204, the measurement plane P2,1 and measurement plane P2,2 are set at positions located a separation distance Δd/2 frontward and rearward from the measurement plane P1,$i$ with the maximum density. Then, the densities of rays in the measurement plane P2,1 and the measurement plane P2,2 are calculated in step S205. A measurement plane with the maximum density is specified in the measurement planes P2,1, P2,2, and P1,$i$ in step S206.

Then, in step S207, the same steps as steps S204 to S206 are repeated until the separation distance becomes significantly short. That is, as shown in FIG. 8, a step of setting a new measurement plane (P3,1 and P3,2 in FIG. 8) at a position located a new separation distance (Δd/4 in FIG. 8), which is half of the previous separation distance, forward and rearward from the measurement plane (P2,2 in FIG. 8) that previously has the maximum density, a step of calculating the density of rays in the new measurement plane, and a step of specifying the measurement plane that previously has the maximum density and a measurement plane out of the new measurement planes that has the maximum are repeated.

It is possible to specify a position on which rays are concentrated in the direction of the optical axis (the lens thickness direction, the Z-axis) through the above-described steps.

The position at which rays converge on a plane perpendicular to the direction of the optical axis (i.e., on the specified measurement plane) is then specified. The above-described PSFs are used to specify this position. A portion (a point on the measurement plane) at which rays are most concentrated is specified using the PSFs as a ray convergence position B on the measurement plane.

Also, the number of rays located outside a radius of 0.1 mm from the ray convergence position B on the measurement plane is calculated, for example. The inside of the radius of 0.1 mm from the convergence position B refers to the "vicinity of the position B" in this specification, for example.

Rays located inside a radius of 0.1 mm from the predetermined position A at which rays converge due to the eyeglass lens 1 (i.e., normal rays that converge at the position A) are subtracted from the rays outside the range. The inside of the radius of 0.1 mm from the convergence position A refers to the "vicinity of the position A" in this specification, for example.

The rays remaining after subtraction do not converge in the vicinity of the position A at which rays converge due to the eyeglass lens 1, and do not converge in the vicinity of the position B at which rays converge due to the coating film convex portion 11 and that is closer to the object. Such rays are referred to as stray light in this specification. Also, even after a coating film is formed on the lens base material 2, the effect of suppressing near-sightedness can be sufficiently exhibited by setting the ratio of stray light rays to 30% or less.

It is preferable that the coating film convex portion 11 causes rays that have entered the eyeglass lens 1 to converge at the position B that is closer to the object than the predetermined position A is by an amount in a range of more than 0 mm and 10 mm or less. In other words, the outermost surface of the eyeglass lens 1 of one aspect of the present disclosure (i.e., the outermost surface of the coating film) has a shape that causes rays that have entered the eyeglass lens 1 to converge at the position B that is closer to the object than the predetermined position A is by an amount in a range of more than 0 mm and 10 mm or less. Note that the above-described range is preferably 0.1 to 7 mm, more preferably 0.1 to 5 mm, and even more preferably 0.3 to 3 mm.

The relationship between a protruding length $L_c$ of the coating film convex portion 11 and a protruding length $L_l$ of the base material convex portion 6 preferably satisfies Formula (1) below.

$$0.6 \leq L_c/L_l \leq 1.5 \qquad \text{Formula (1)}$$

When this condition is satisfied, the coating film convex portion 11 originating from the base material convex portion 6 can sufficiently bring the convergence position B of rays that have entered the eyeglass lens 1 closer to the object than the predetermined position A, even if a coating film is formed on the base material convex portion 6. This means that the coating film convex portion 11 and thus the eyeglass lens 1 of one aspect of the present disclosure can exhibit a sufficient near-sightedness suppression effect.

Note that a "protruding length" refers to the distance from the base portion of the outermost surface shape of the eyeglass lens 1 to the vertex of the coating film convex portion 11 in the direction of the optical axis (the lens thickness direction, the Z-axis).

It is preferable that the full width at half maximum of a profile curve of the astigmatism at the base of the coating film convex portion 11 in an astigmatism distribution with respect to the outermost surface shape of the coating film is 0.20 mm or less.

Figure 10:
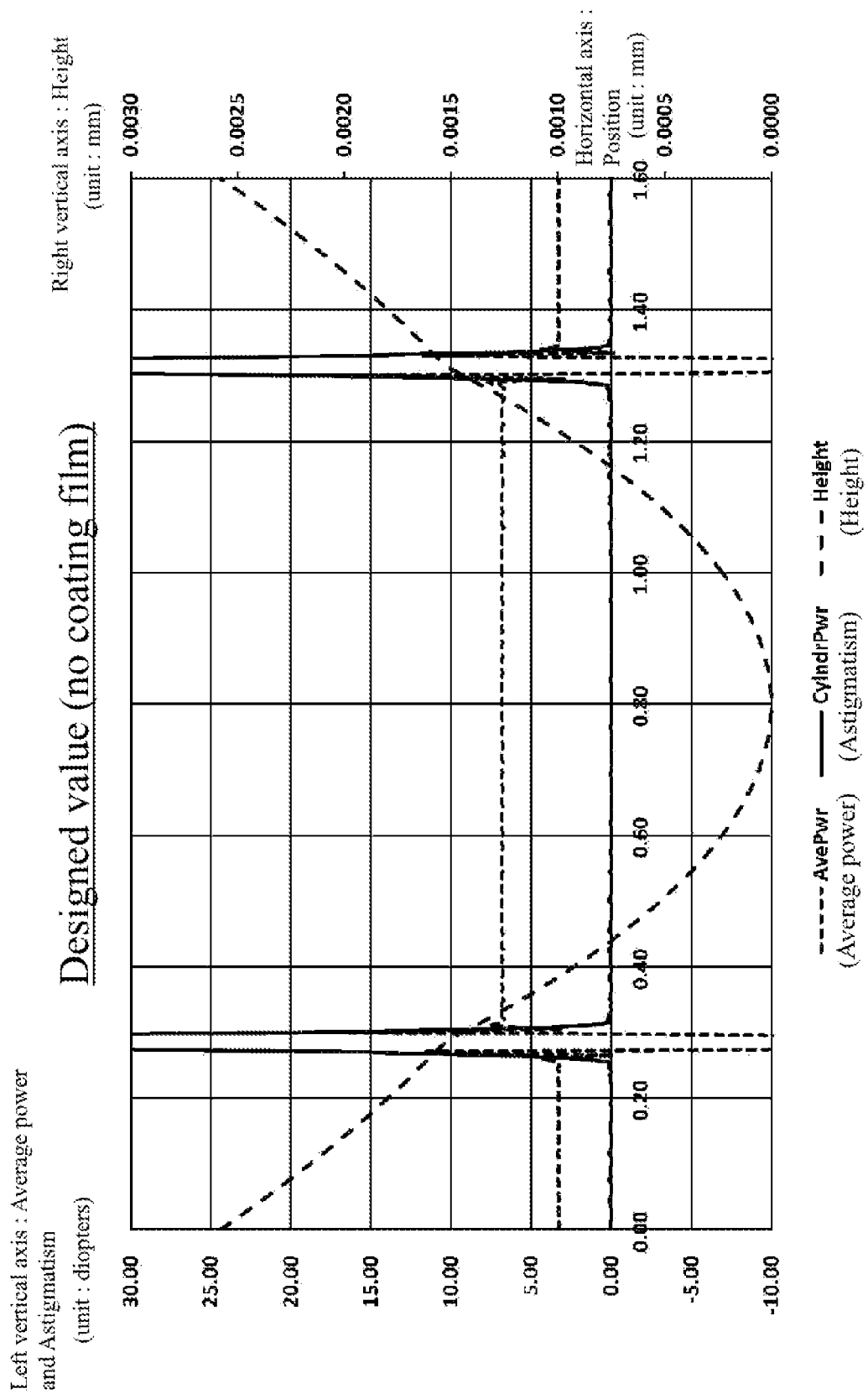
FIG. 10 is a diagram showing a plot (solid line) of, with regard to designed values (i.e., no coating film), the astigmatism distribution (i.e., an astigmatism profile curve) on a cross-section passing through the vertex of a base material convex portion (i.e., the center of the base material convex portion in a plan view), in the astigmatism distribution with respect to the base material convex portion and the vicinity thereof.

FIG. 10 is a diagram showing a plot (solid line) of, with regard to designed values (i.e., no coating film), the astigmatism distribution (i.e., an astigmatism profile curve) on a cross-section passing through the vertex of the base material convex portion 6 (i.e., the center of the base material convex portion 6 in a plan view), in the astigmatism distribution with respect to the base material convex portion 6 and the vicinity thereof.

Figure 11:
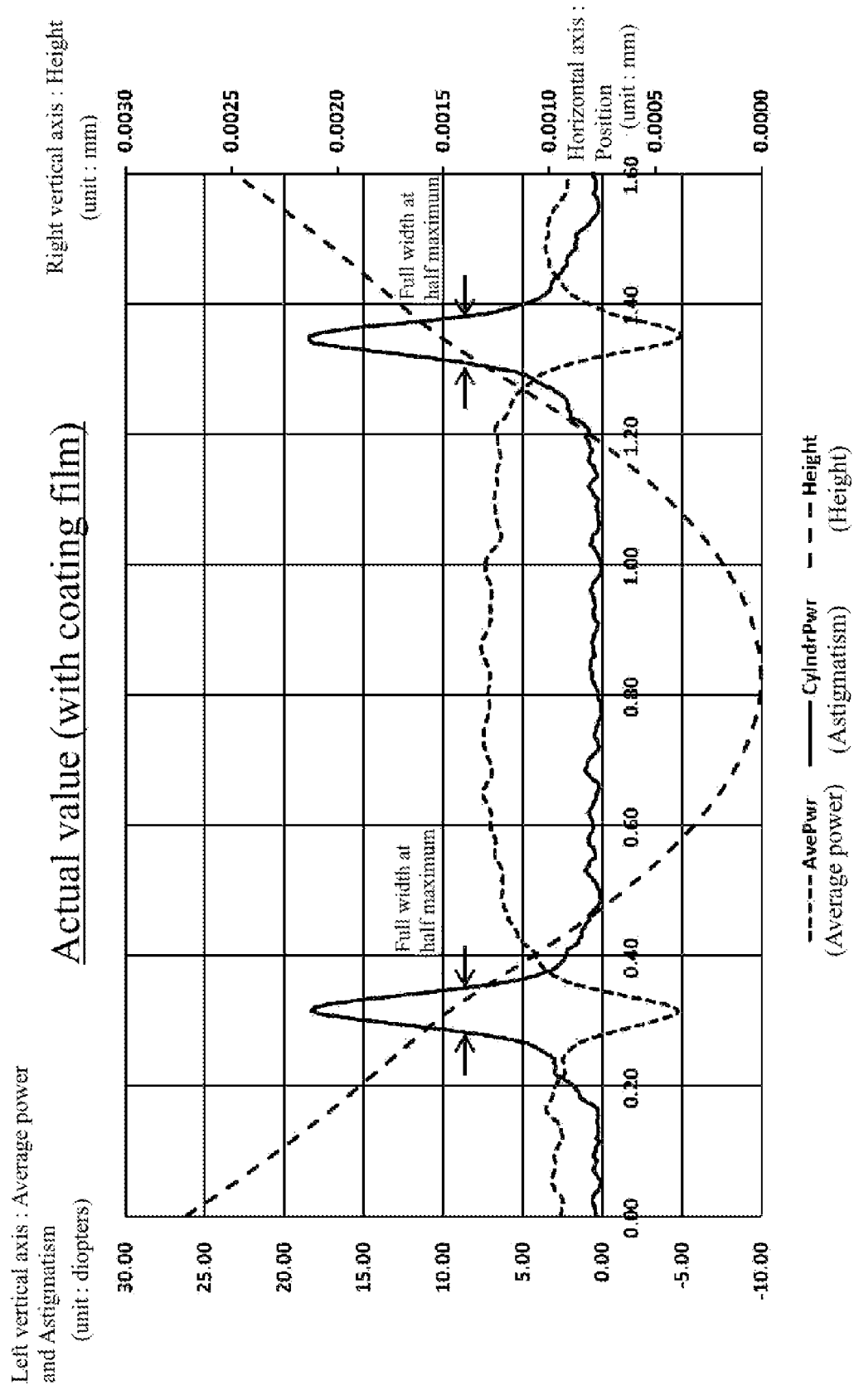
FIG. 11 is a diagram showing a plot (solid line) of the astigmatism distribution (i.e., an astigmatism profile curve) on a cross-section passing through the vertex of a coating film convex portion (i.e., the center of the coating film convex portion in a plan view), in the astigmatism distribution with respect to an actual coating film convex portion and the vicinity thereof.

FIG. 11 is a diagram showing a plot (solid line) of the astigmatism distribution (i.e., an astigmatism profile curve) on a cross-section passing through the vertex of the coating film convex portion 11 (i.e., the center of the coating film convex portion in a plan view), in the astigmatism distribution with respect to the actual coating film convex portion 11 and the vicinity thereof.

In FIGS. 10 and 11, the horizontal axis indicates the X-axis, i.e., a position in the horizontal direction when the object-side surface 3 of the eyeglass lens 1 is viewed in a planar view, and the units thereof are in mm. The Y-axis, i.e., a vertical (up-down) direction when the object-side surface 3 of the eyeglass lens 1 is viewed in a planar view may be used, instead of the X-axis.

The left vertical axis indicates a value of astigmatism (and average power), and the units thereof are in diopter.

The right axis indicates the height of the coating film convex portion 11 or the base material convex portion 6, and the units thereof are in mm.

Note that the coating film convex portion 11 or the base material convex portion 6 is a portion with 0.3 to 1.3 mm in the horizontal axis. Also, a plot (dotted line) of an average power distribution (i.e., average power distribution profile curve), and a plot (broken line) of the height of the coating film convex portion 11 or the base material convex portion 6 in the Z-axis are also shown.

As shown in FIG. 10, in terms of design, the astigmatism profile curve is substantially constant in the base material convex portion 6 and a substantially horizontal portion, which is the base portion, and only a portion between the base material convex portion 6 and the base portion has a shape different from a spherical shape. Thus, only this portion has a high astigmatism value.

On the other hand, as shown in FIG. 11, with the astigmatism profile curve for the actual coating film convex portion 11 and the vicinity thereof, astigmatism relatively increases in a comparatively wide range in the X-axis direction between the coating film convex portion 11 and the base portion (the vicinity of X=0.3 mm and the vicinity of X=1.3 mm). This indicates that the portion located between the coating film convex portion 11 and the base portion has a shape that is different from a spherical shape in a comparatively wider range, compared to that shown in FIG. 10, which is a designed value.

One of the causes of stray light rays is that the shape changes excessively slowly from the base portion at the base of the coating film convex portion 11. That is to say, if the base portion and the coating film convex portion 11 are clearly separated from each other, one of the causes of stray light rays can be eliminated, and thus the effect of suppressing near-sightedness can be sufficiently exhibited even after a coating film is formed on the lens base material 2. In view of this, the astigmatism profile curve is utilized to prove that there are not many portions having a halfway shape, which is one of the causes of stray light rays, between the base portion and the coating film convex portion 11. That is to say, the degree of a change (i.e., a gradient change) in the shape of the base of the coating film convex portion 11 is defined using the astigmatism profile curve for the coating film convex portion 11.

As the name suggests, the peak width at half of the value (in diopters) of the peak apex point may be used for the full width at half maximum shown in FIG. 11 pertaining to the actual eyeglass lens. In FIG. 11, for example, the full width at half maximum is about 0.10 mm in the vicinity of X=0.3 mm and in the vicinity of X=1.3 mm.

By defining the full width at half maximum of the astigmatism profile curve as 0.20 mm or less, it is shown that the shape thereof rapidly changes from the base portion toward the coating film convex portion 11, and thus the eyeglass lens 1 of one aspect of the present disclosure can sufficiently exhibit the effect of suppressing near-sightedness.

It is preferable that the coating film includes a $\lambda/4$ film (not shown) that is in contact with the lens base material 2, the hard coating film 8 formed on the $\lambda/4$ film, and the antireflection film 10 formed on the hard coating film 8.

There is no limitation to the $\lambda/4$ film as long as the $\lambda/4$ film is a film that optically has a thickness of $\lambda/4$, and a film that is used for an antireflection filter may also be used. A urethane resin (having a refractive index n of 1.54) may be used as the $\lambda/4$ film as one specific example, and the thickness thereof may be 70 to 90 nm.

There is no particular limitation to the hard coating film 8 as long as the scratch resistance of the eyeglass lens 1 can be improved. A silicon compound (having a refractive index n of 1.50) may be used as the hard coating film 8 as one specific example, and the thickness thereof may be 1.5 to 1.9 μm.

A known antireflection film may be used as the antireflection film 10.

It is preferable that the refractive index of the lens base material 2 is higher than that of the $\lambda/4$ film, and the refractive index of the $\lambda/4$ film is higher than that of the hard coating film 8.

The following describes specific contents other than the above-described contents.

[Lens Base Material 2]

Aspects of the size of the base material convex portion 6 and the arrangement of the plurality of base material convex portions 6 on the surface of the lens base material 2 are not particularly limited, and can be determined from the viewpoint of external visibility of the base material convex portion 6, designability given by the base material convex portion 6, adjustment of the refractive power by the base material convex portion 6, and the like, for example. The height of the base material convex portion 6 may be 0.1 to 10 μm, for example, and the radius of curvature of the surface of the base material convex portion 6 may be 50 to 250 mmR, for example. Also, the distance between adjacent base material convex portions 6 (the distance between an end portion of a given base material convex portion 6 and an end portion of a base material convex portion 6 that is adjacent to this base material convex portion 6) may be substantially the same as the radius of the base material convex portion 6, for example. Also, the plurality of base material convex portions 6 can be evenly arranged in the vicinity of the center of the lens, for example.

Various lens base materials 2 that are usually used for the eyeglass lens 1 can be used as the lens base material 2. The lens base material 2 may be a plastic lens base material or a glass lens base material, for example. The glass lens base material may be a lens base material made of inorganic glass, for example. From the viewpoint of light in weight and unlikely to crack, a plastic lens base material is preferable as the lens base material 2. Examples of the plastic lens base material include styrene resins such as (meth)acrylic resins, allyl carbonate resins such as polycarbonate resins, allyl resins, diethylene glycol bis(allyl carbonate) resin (CR-39), vinyl resins, polyester resins, polyether resins, urethan resins obtained through a reaction between an isocyanate compound and a hydroxy compound such as diethylene glycol, thiourethane resins obtained through a reaction between an isocyanate compound and a polythiol compound, and cured products (generally called transparent resins) obtained by curing a curable composition containing a (thio) epoxy compound having one or more disulfide bonds in the molecule. The curable composition may be referred to as a "polymerizable composition". An undyed base material (colorless lens) or a dyed base material (dyed lens) may be used as the lens base material 2. Although there are no particular limitations to the thickness and the diameter of the lens base material 2, the lens base material 2 may have a thickness (the central wall thickness) of about 1 to 30 mm, and have a diameter of about 50 to 100 mm, for example. The refractive index of the lens base material 2 may be set to about 1.60 to 1.75, for example. However, the refractive index of the lens base material 2 is not limited to the above-described range, and may be in the above-described range or may be separated vertically from the range. In the present disclosure and this specification, the "refractive index" refers to a refractive index for light having a wavelength of 500 nm. The lens base material 2 can be formed using a known forming method such as cast polymerization. The lens base material 2 having the base material convex portions 6 on at least one surface can be obtained by forming the lens base material 2 through cast polymerization, using a mold having a molding surface provided with a plurality of recesses, for example.

[Coating Film]

An example of one aspect of the coating film formed on a surface of the lens base material 2 having the base material convex portions 6 is a cured film formed by curing a curable composition containing a curable compound. Such a cured film is generally called a hard coating film 8, and contributes to improving the durability of the eyeglass lens 1. The curable compound refers to a compound having a curable functional group, and the curable composition refers to a composition containing one or more curable compounds.

Examples of one aspect of the curable composition for forming the cured film include curable compositions containing an organosilicon compound as a curable compound, and curable compositions containing metal oxide particles together with an organosilicon compound. An example of the curable composition that can form the cured film is a curable composition disclosed in JP S63-10640A.

Also, examples of one aspect of organosilicon compound may include organosilicon compounds represented by General Formula (I) below and hydrolysates thereof.

$$(R^1)_a(R^3)_b Si(OR^2)_{4-(a+b)} \qquad (I)$$

In General Formula (I), $R^1$ represents an organic group having a glycidoxy group, an epoxy group, a vinyl group, a methacryloxy group, an acryloxy group, a mercapto group, an amino group, a phenyl group, or the like, $R^2$ represents an alkyl group having 1 to 4 carbon atoms, an acyl group having 1 to 4 carbon atoms, or an aryl group having 6 to 10 carbon atoms, $R^3$ represents an alkyl group having 1 to 6 carbon atoms or an aryl group having 6 to 10 carbon atoms, and a and b each represent 0 or 1.

The alkyl group having 1 to 4 carbon atoms represented by $R^2$ is a linear or branched alkyl group, and specific examples thereof include a methyl group, an ethyl group, a propyl group, and a butyl group.

Examples of the acyl group having 1 to 4 carbon atoms represented by $R^2$ include an acetyl group, a propionyl group, an oleyl group, a benzoyl group.

Examples of the aryl group having 6 to 10 carbon atoms represented by $R^2$ include a phenyl group, a xylyl group, and a tolyl group.

The alkyl group having 1 to 6 carbon atoms represented by $R^3$ is a linear or branched alkyl group, and specific examples thereof include a methyl group, an ethyl group, a propyl group, a butyl group, a pentyl group, and a hexyl group.

Examples of the aryl group having 6 to 10 carbon atoms represented by $R^3$ include a phenyl group, a xylyl group, and a tolyl group.

Specific examples of the compound represented by General Formula (I) above includes the compounds disclosed in paragraph 0073 of JP 2007-077327A.

The organosilicon compound represented by General Formula (I) has a curable group, and thus the hard coating film 8 can be formed as a cured film by performing a curing process after a composition is applied.

Metal oxide particles may contribute to adjusting the refractive index of a cured film and improving the hardness of a cured film. Specific examples of the metal oxide particles include particles of tungsten oxides ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), antimony oxide ($Sb_2O_5$), and the like, and one type of metal oxide particles can be used alone, or two or more types of metal oxide particles can be used in combination. The particle size of the metal oxide particles is preferably in a range of 5 to 30 nm from the viewpoint of improving scratch resistance and optical properties of a cured film. The content of metal oxide particles in a curable composition can be set as appropriate in consideration of the refractive index and the hardness of a cured film to be formed, and usually, may be set to about 5 to 80 mass % with respect to the solid content of the curable composition. Also, the metal oxide particles are preferably colloidal particles from the viewpoint of dispersibility in a cured film.

The cured film can be formed by forming a covering film by directly applying or indirectly applying via another film, to a surface of the lens base material 2 having the base material convex portions 6, a curable composition prepared by mixing the above-described components and optional components such as an organic solvent, a surfactant (leveling agent), and a curing agent as needed, and performing a curing process (e.g., heating and/or photoirradiation) on the covering film according to the type of curable compound. Application of a curable composition will be described later in detail. If a curing process is performed through heating, for example, a curing reaction of a curable compound in a covering film can proceed by disposing the lens base material 2 provided with the film coated with the curable composition in an environment having an ambient temperature of 50° C. to 150° C. for about 30 minutes to 2 hours.

From the viewpoint of application suitability for spin coating, the viscosity of a curable composition for forming a coating film on the surface of the lens base material 2 having the base material convex portions 6 is preferably in a range of 1 to 50 mPa·s, more preferably in a range of 1 to 40 mPa·s, and even more preferably in a range of 1 to 20 mPa·s. The viscosity in the present disclosure and this specification refers to the viscosity at a liquid temperature of 25° C.

Also, a coating film that is generally called a primer film and contributes to improving adherence between layers is an example of one aspect of the coating film formed on the surface of the lens base material 2 having the base material convex portions 6. Examples of a coating liquid capable of forming such a coating film include compositions (referred to as a "dry solidifying composition" hereinafter) in which a resin component such as a polyurethane resin is dispersed in a solvent (water, an organic solvent, or a solvent obtained by mixing them). Solidification of such a composition proceeds by removing a solvent through drying. Drying can be performed through a drying process such as air drying or heat drying.

From the viewpoint of application suitability for spin coating, the viscosity of a dry solidifying composition for forming a coating film on the surface of the lens base material 2 having the base material convex portions 6 is preferably in a range of 1 to 50 mPa·s, more preferably in a range of 1 to 40 mPa·s, and even more preferably in a range of 1 to 20 mPa·s.

[Supply of Coating Liquid]

A coating liquid for forming a coating film on the surface of the lens base material 2 having the base material convex portions 6 is supplied through spin coating. When the coating liquid is applied through spin coating, it is possible to inhibit a coating film from having an uneven film thickness due to liquid building up around the base material convex portions 6. The coating liquid can be applied through spin coating by placing the lens base material 2 in the spin coater with the surface thereof having the base material convex portions 6 facing vertically upward, and supplying the coating liquid onto the surface from above (e.g., discharging the coating liquid from a nozzle arranged above the surface) in a state in which the lens base material 2 is rotated on the spin coater, for example. Here, from the viewpoint of forming a coating film having a more even thickness, the rotational speed of the lens base material 2 in the spin coating is preferably in a range of 10 to 3000 rpm (rotations per minute), more preferably in a range of 50 to 2500 rpm, and even more preferably in a range of 100 to 2000 rpm.

It is possible to form a coating film by performing processes (e.g., a curing process, a drying process, and the like) according to the type of coating liquid after the coating liquid is applied.

The film thickness of the coating film formed through the above-described steps may be in a range of 0.5 to 100 μm, for example. However, the film thickness of the coating film is determined depending on the functions required for the coating film, and is not limited to the above-described exemplary range.

It is also possible to form one or more coating films on the coating film. Examples of such coating films include various coating films such as the antireflection film 10, water repellent or hydrophilic antifouling films, and antifogging films. A known technique can be applied as a method for forming these coating films.

Also, if one of the surfaces of the lens base material 2 has no base material convex portion 6, it is also possible to form one or more coating films on such surfaces of the lens base material 2. Examples of such a coating film include various coating films that are generally provided on the eyeglass lens 1 (e.g., the hard coating film 8, a primer film, the antireflection film 10, an antifouling film, an antifogging film, and the like), and it is possible to apply a known technique to a method for forming these coating films.

In addition to or in place of the above-described specification of the eyeglass lens of one aspect of the present disclosure, the following provisions may also be used.

In one aspect of the present disclosure, the maximum absolute value of differences in the lens thickness direction between the shape of the coating film convex portion and the shape of the base material convex portion is 0.1 μm or less (preferably, 0.06 μm or less).

The following describes advantages for defining the above-described difference.

Even if the coating film is formed on the lens base material 2 and the coating film convex portion 11 has a more obtuse shape than the base material convex portion 6 does, at least a vertex portion of the coating film convex portion 11 has a shape following the base material convex portion 6.

That is to say, in one aspect of the present disclosure, the substantially partially spherical shape of the actual coating film convex portion 11 is compared to the partially spherical shape of the actual lens base material 2.

Figure 12A:
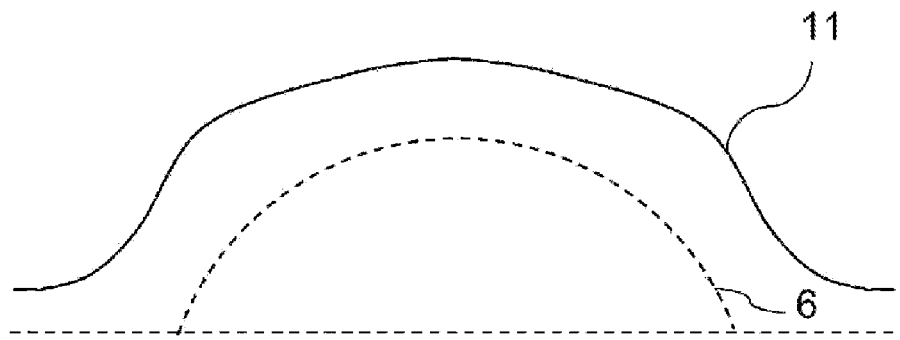
FIG. 12A is a schematic cross-sectional view showing a coating film convex portion and a base material convex portion of an actual eyeglass lens.
Figure 12B:
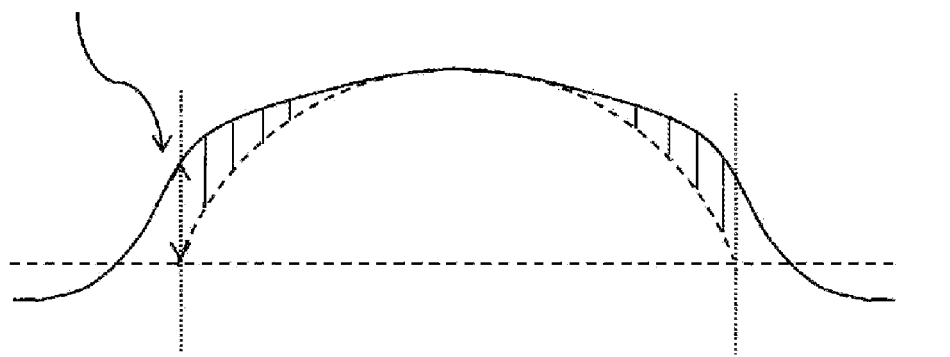
FIG. 12B is a schematic cross-sectional view in which the vertex of the coating film convex portion and the vertex of the base material convex portion are matched.

FIG. 12A is a schematic cross-sectional view showing the coating film convex portion 11 and the base material convex portion 6 of the actual eyeglass lens 1. FIG. 12B is a schematic cross-sectional view in which the vertex of the coating film convex portion 11 is matched with the vertex of the base material convex portion 6. The solid line indicates the coating film convex portion 11 of the actual eyeglass lens 1, the broken line indicates the base material convex portion 6, and a vertical line portion indicates the difference in the lens thickness direction between the shape of the coating film convex portion and the shape of the base material convex portion.

In FIG. 12B, the vertex of the coating film convex portion 11 is matched with the vertex of the base material convex portion 6, and then the difference in the lens thickness direction (an optical axis method) between the actual base material convex portion 6 and the coating film convex portion 11 of the actual eyeglass lens 1, from a protrusion start portion that protrudes from the base portion of the base material convex portion 6 to a protrusion end portion via the vertex.

If the maximum absolute value of the differences is 0.1 μm or less (preferably 0.06 μm or less), it is deemed that the coating film faithfully follows the shape of the base material convex portion 6 present below the coating film. It was found that as a result, the effect of suppressing near-sightedness can be sufficiently exhibited. The effect of suppressing near-sightedness can be sufficiently exhibited by applying this provision. Note that the similarity ratio between the shape of the coating film convex portion 11 and the shape of the base material convex portion 6 may be defined.

With the above-described one aspect of the present disclosure, a case was described in which the maximum absolute value in the lens thickness direction between a spherical surface that is optimally approximated to the shape of the coating film convex portion 11 and the shape of the actual coating film convex portion 11 was set to 0.1 μm or less. On the other hand, the eyeglass lens 1 according to the present disclosure is not limited to the provision of this difference. In short, the aim of the present disclosure is that a convex portion present on the outermost surface of the eyeglass lens 1 located on the side on which the base material convex portions 6 are provided causes rays that have entered the eyeglass lens 1 to converge at the position B that is closer to the object than the predetermined position A is even after a coating film is formed, and this aim is novel.

The above-described technical ideas of the eyeglass lens of one aspect of the present disclosure can also be applied to an eyeglass lens having a farsightedness suppression function. Specifically, "convex portions" of the coating film convex portion 11 and the base material convex portion 6 are changed to "concave portions". Accordingly, a coating film concave portion can cause rays that have entered the eyeglass lens to converge at a position B' that is located on the "eyeball side" of the predetermined position A. By changing the "convex portion" to a "concave portion" in the above-described eyeglass lens of one aspect of the present disclosure and changing a configuration such that rays converge at a position B' that is located on the "eyeball side" of the predetermined position A, the eyeglass lens has a farsightedness suppression function.

LIST OF REFERENCE NUMERALS

1 Eyeglass lens
2 Lens base material
3 Object-side surface (convex surface)
4 Eyeball-side surface (concave surface)
6 Base material convex portion
8 Hard coating film
10 Antireflection film
11 Coating film convex portion
20 Eyeball
20A Retina
30 Eyeglass lens model
32 Eyeball model
32A Retina
33 Object-side surface (convex surface) on model
36 Coating film convex portion on model

The invention claimed is:

1. An eyeglass lens configured to cause rays from a point source at infinity that enter the eyeglass lens at an object side of the eyeglass lens to exit the eyeglass lens from an eyeball side of the eyeglass lens and converge at a predetermined position A, the eyeglass lens comprising:
a lens base material having an object-side surface and an eyeball-side surface, at least one of the object-side surface and the eyeball-side surface including a plurality of base material convex portions; and
a coating film covering the at least one of the object-side surface and the eyeball-side surface that includes the plurality of base material convex portions,
wherein the coating film includes a plurality of coating film convex portions, and
wherein, for each of the plurality of coating film convex portions:
a shape of an outermost surface of the coating film convex portion originates from a shape of an outermost surface of a corresponding one of the plurality of base material convex portions, and the coating film convex portion is configured to cause rays from a point source at infinity that have entered the eyeglass lens to converge at a corresponding one of the plurality B of positions that is closer to the object than the predetermined position A is, and a maximum absolute value of differences in a lens thickness direction between a spherical surface that is optimally approximated to a shape of the coating film convex portion and the shape of the actual coating film convex portion is 0.1 μm or less wherein, at the at least one of the object-side surface and the eyeball-side surface that includes the plurality of base material convex portions, a corresponding outermost surface of the eyeglass lens includes a plurality of convex portions, and wherein, for each of the plurality of convex portions, a shape of the convex portion approximates a shape of a corresponding one of the plurality of base material convex portions, and wherein the plurality of base material convex portions is configured to cause rays from a point source at infinity that have entered the eyeglass lens to converge at a plurality of positions B that are closer to the object than the predetermined position A is.

2. The eyeglass lens according to claim 1, wherein each of the plurality B of positions is closer to the object than the predetermined position A is by an amount in a range of more than 0 mm and 10 mm or less.

3. The eyeglass lens according to claim 1, wherein, out of a large number of rays from a point source at infinity that evenly enter a predetermined range of the object side of the eyeglass lens and pass through the coating film, the proportion that pass through neither the vicinity of the predetermined position A nor the vicinity of any of the plurality B of positions is less than or equal to 30% of the large number of rays.

4. The eyeglass lens according to claim 1, wherein, for at least one of the plurality of coating film convex portions, the full width at half maximum of a profile curve of cylinder power at a base of the coating film convex portion in a distribution of cylinder power for the shape of the outermost surface of the coating film is 0.20 mm or less.

5. The eyeglass lens according to claim 1, wherein the coating film includes a λ/4 film that is in contact with the lens base material, a hard coating film formed on the λ/4 film, and an antireflection film formed on the hard coating film.

6. The eyeglass lens according to claim 5, wherein a refractive index of the lens base material is higher than that of the λ/4 film, and a refractive index of the λ/4 film is higher than that of the hard coating film.

* * * * *

UNITED STATES PATENT AND TRADEMARK OFFICE
CERTIFICATE OF CORRECTION

PATENT NO. : 11,880,094 B2
APPLICATION NO. : 17/255411
DATED : January 23, 2024
INVENTOR(S) : Hua Qi, Takako Ishizaki and Shigetoshi Kono It is certified that error appears in the above-identified patent and that said Letters Patent is hereby corrected as shown below:

On the Title Page

Item (71) Applicant
Please replace "HOYA LENS THAILAND LTD., Pathumthani (TH); Hua Qi, Tokyo (JP); Takako Ishizaki, Tokyo (JP); Shigetoshi Konol; Tokyo (JP)" with --HOYA LENS THAILAND LTD., Pathumthani (TH)--

Signed and Sealed this
Sixteenth Day of April, 2024

Katherine Kelly Vidal
*Director of the United States Patent and Trademark Office*